United States Patent
Tertel et al.

(10) Patent No.: US 9,328,294 B2
(45) Date of Patent: May 3, 2016

(54) PROCESS AND APPARATUS FOR EXTRACTING SULFUR COMPOUNDS IN A HYDROCARBON STREAM

(75) Inventors: Jonathan Andrew Tertel, Mt. Prospect, IL (US); Aziz Sattar, West Chicago, IL (US); Travis C. Bowen, Crystal Lake, IL (US); George K. Xomeritakis, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 309 days.

(21) Appl. No.: 13/602,530

(22) Filed: Sep. 4, 2012

(65) Prior Publication Data

US 2014/0066682 A1    Mar. 6, 2014

(51) Int. Cl.
| | |
|---|---|
| *C10G 19/08* | (2006.01) |
| *B01D 61/00* | (2006.01) |
| *B01D 63/02* | (2006.01) |
| *B01D 11/04* | (2006.01) |
| *C10G 31/09* | (2006.01) |
| *C10G 19/02* | (2006.01) |

(Continued)

(52) U.S. Cl.
CPC ............ *C10G 19/08* (2013.01); *B01D 11/0415* (2013.01); *B01D 61/00* (2013.01); *B01D 63/02* (2013.01); *C10G 19/02* (2013.01); *C10G 31/09* (2013.01); *C10G 53/08* (2013.01); *B01D 2311/04* (2013.01); *B01D 2311/2634* (2013.01); *C10G 2300/202* (2013.01); *C10L 3/12* (2013.01); *C10L 2290/545* (2013.01); *C10L 2290/548* (2013.01)

(58) Field of Classification Search
CPC .. C07C 2/62; C07C 2527/1206; C07C 7/005; C01B 7/195; C07D 333/48; C10G 29/16; C10G 27/06; C10G 19/02; C10G 19/00; C10G 19/08; C10G 53/08; C10G 31/09; C10G 2300/202; B01D 11/0415; B01D 63/02; B01D 61/00; B01D 2311/2634; B01D 2311/04; C10L 2290/548; C10L 2290/545; C10L 3/12
USPC ........................ 585/802; 208/183, 208 R, 211
See application file for complete search history.

(56) References Cited

U.S. PATENT DOCUMENTS

| | | | | |
|---|---|---|---|---|
| 3,956,112 A | * | 5/1976 | Lee et al. | 210/644 |
| 3,977,829 A | * | 8/1976 | Clonts | 422/256 |
| 4,966,707 A | | 10/1990 | Cussler et al. | |

(Continued)

FOREIGN PATENT DOCUMENTS

| | | |
|---|---|---|
| JP | 03872605 | 1/2007 |
| RU | 2352610 C2 | 4/2009 |

OTHER PUBLICATIONS

U.S. Appl. No. 13/602,469, filed Sep. 4, 2012, Tertel et al.

(Continued)

*Primary Examiner* — Prem C Singh
*Assistant Examiner* — Juan Valencia

(57) ABSTRACT

One exemplary embodiment can be a process for extracting sulfur compounds in a hydrocarbon stream. The process can include feeding a hydrocarbon stream containing sulfur compounds to a prewash zone containing an alkali, withdrawing a prewashed hydrocarbon stream from the prewash zone, and feeding the prewashed hydrocarbon stream to a mass transfer zone for extracting one or more thiol compounds from the prewashed hydrocarbon stream. Often, the mass transfer zone includes a hollow fiber membrane contactor.

11 Claims, 2 Drawing Sheets

(51) Int. Cl.
*C10G 53/08* (2006.01)
*C10L 3/12* (2006.01)

(56) References Cited

U.S. PATENT DOCUMENTS

| | | | |
|---|---|---|---|
| 4,997,569 A | 3/1991 | Sirkar | |
| 6,586,638 B1* | 7/2003 | Zhang et al. | 568/749 |
| 7,207,445 B2 | 4/2007 | Manna et al. | |
| 7,223,332 B1 | 5/2007 | Tertel | |
| 7,326,333 B2 | 2/2008 | Laricchia et al. | |
| 7,713,399 B2 | 5/2010 | Martinie et al. | |
| 7,985,331 B2 | 7/2011 | Baudot et al. | |
| 2004/0050791 A1* | 3/2004 | Herczeg | 210/651 |
| 2008/0308503 A1* | 12/2008 | Zhang et al. | 210/704 |
| 2010/0122784 A1 | 5/2010 | Jemaa et al. | |
| 2010/0151311 A1 | 6/2010 | Usami et al. | |
| 2011/0000823 A1* | 1/2011 | Hamad et al. | 208/236 |
| 2012/0000827 A1 | 1/2012 | Krupa et al. | |
| 2014/0066682 A1 | 3/2014 | Tertel et al. | |

OTHER PUBLICATIONS

U.S. Appl. No. 13/602,638, filed Sep. 4, 2012, Tertel et al.
Abstract of CN 101100613, by China Academy of Science Dalian Institute of Chemical Physics, published Jan. 9, 2008.
Deriszadeh et al., "Improved Meuf Removal of Naphthenic Acids from Produced Water", Journal of Membrane Science, Jan. 5, 2009, vol. 326, No. 1, pp. 161-167.
Marzouk et al., "Simultaneous Removal of CO2 and H2S from Pressurized CO2—H2S—CH4 Gas Mixture Using Hollow Fiber Membrane Contactors", Separation and Purification Technology, Feb. 15, 2012, vol. 86, pp. 88-97.
Netke et al., "Extraction of Naphthenic Acid from Kerosene Using Porous and Nonporous Polymeric Membranes", Separation Science and Technology, 1996, vol. 31, No. 1, pp. 63-76.
Yaoqiang et al., "Removal of Hydrogen Sulphide from High Salinity Wastewater by Emulsion Liquid Membrane", The Canadian Journal of Chemical Engineering, Feb. 2012, vol. 90, No. 1, pp. 120-125.
Search Report dated Dec. 19, 2013 for corresponding PCT Appl. No. PCT/US2013/057008.

* cited by examiner

PROCESS AND APPARATUS FOR EXTRACTING SULFUR COMPOUNDS IN A HYDROCARBON STREAM

FIELD OF THE INVENTION

The process and apparatus for extracting sulfur compounds in a hydrocarbon stream.

DESCRIPTION OF THE RELATED ART

A sulfur removal process can extract one or more thiol compounds from a liquefied petroleum gas or a light naphtha to a caustic stream in order to meet product specifications. Currently, this operation can be conducted in either a trayed column or a fiber film contactor. In both operations, intimate mixing of the two immiscible liquids can occur, which then may require settling time to separate these liquids. Thus, settling vessels are required downstream of the contacting vessels.

Unfortunately, the settling vessels increase capital costs and inventory of materials within the unit. Hence, it would be desirable to minimize the equipment required to remove the one or more thiol compounds yet meet product specifications for a liquefied petroleum gas or a light naphtha.

SUMMARY OF THE INVENTION

One exemplary embodiment can be a process for extracting sulfur compounds in a hydrocarbon stream. The process can include feeding a hydrocarbon stream containing sulfur compounds to a prewash zone containing an alkali, withdrawing a prewashed hydrocarbon stream from the prewash zone, and feeding the prewashed hydrocarbon stream to a mass transfer zone for extracting one or more thiol compounds from the prewashed hydrocarbon stream. Often, the mass transfer zone includes a hollow fiber membrane contactor.

Another exemplary embodiment may be an apparatus for extracting sulfur compounds in a hydrocarbon stream. The apparatus may include a prewash zone for receiving the hydrocarbon stream, a mass transfer zone for receiving a prewashed hydrocarbon stream, an oxidation zone for receiving an alkaline solution from the mass transfer zone, and a separation zone for receiving the alkaline solution from the oxidation zone. Generally, the mass transfer zone includes a hollow fiber membrane contactor.

A further exemplary embodiment may be a process for extracting sulfur compounds in a hydrocarbon stream. The process can include feeding a liquefied petroleum gas to a mass transfer zone for extracting one or more thiol compounds from the liquefied petroleum gas. Typically, the mass transfer zone includes a hollow fiber membrane contactor.

The embodiments disclosed herein can provide a hollow fiber membrane contactor for extracting one or more thiol compounds, such as methanethiol, ethanethiol, propanethiol, and/or butanethiol from a light hydrocarbon liquid stream into a lean alkaline stream. The thiol compounds can pass through the pores of the membrane from the hydrocarbon to the alkaline solution, where the thiol may react to form a salt, such as a sodium thiol compound. Both sides of the membrane may be kept at almost the same pressure to limit the amount of dispersive mixing, thus reducing or eliminating downstream removal of the alkaline solution from the hydrocarbon.

DEFINITIONS

As used herein, the term "stream" can include various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 . . . Cn where "n" represents the number of carbon atoms in the one or more hydrocarbon molecules. Furthermore, a superscript "+" or "−" may be used with an abbreviated one or more hydrocarbons notation, e.g., C3$^+$ or C3$^-$, which is inclusive of the abbreviated one or more hydrocarbons. As an example, the abbreviation "C3$^+$" means one or more hydrocarbon molecules of three carbon atoms and/or more. In addition, the term "stream" may be applicable to other fluids, such as aqueous and non-aqueous solutions of an alkali, such as sodium hydroxide.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "rich" can mean an amount of generally at least about 50%, and preferably about 70%, by mole, of a compound or class of compounds in a stream. If referring to a solute in solution, e.g., one or more thiol compounds in an alkaline solution, the term "rich" may be referenced to the equilibrium concentration of the solute. As an example, about 5%, by mole, of a solute in a solvent may be considered rich if the concentration of solute at equilibrium is 10%, by mole.

As used herein, the term "substantially" can mean an amount of at least generally about 80%, preferably about 90%, and optimally about 99%, by weight, of a compound or class of compounds in a stream.

As used herein, the term "parts per million" may be abbreviated herein as "ppm" and "weight ppm" may be abbreviated herein as "wppm". Generally, parts per million is based on weight unless otherwise indicated.

As used herein, the term "alkali" can mean any substance that in solution, typically a water solution, has a pH value greater than about 7.0, and exemplary alkali can include sodium hydroxide, potassium hydroxide, or ammonia. Such an alkali in solution may be referred to as an alkaline solution or an alkaline.

As used herein, the term "thiol" can include a mercaptan and a salt thereof, such as a mercaptide. A thiol can be of the formula RSH or a salt of the formula RS$^-$M$^+$ where R is a hydrocarbon group, such as an alkyl or aryl group, that is saturated or unsaturated and optionally substituted, and M is a metal, such as sodium or potassium.

As used herein, the weight percent or ppm of sulfur, e.g., "wppm-sulfur" is the amount of sulfur in a hydrocarbon stream and not the amount of the sulfur-containing species unless otherwise indicated. As an example, methylthiol, $CH_3SH$, has a molecular weight of 48.1 with 32.06 represented by the sulfur atom, so the molecule is about 66.6%, by weight, sulfur. As a result, the actual sulfur compound concentration can be higher than the wppm-sulfur from the compound.

As used herein, the term "thiol-tainted alkaline solution" can mean an alkaline solution having a typical level of one or more thiols after exiting the mass transfer zone and prior to treatment in a thiol oxidation zone. It may or may not have the desired levels of other sulfur-containing compounds, such as one or more disulfides. Typically, "thiol-tainted alkaline solution" may have up to about 50,000 wppm of one or more thiol compounds.

As used herein, the term "lean alkaline solution" is an alkaline solution having been treated and having desired levels of sulfur, including one or more thiol compounds and/or one or more disulfides for treating one or more C1-C10 hydrocarbons in an extraction zone.

As used herein, the term "liquefied petroleum gas" can include one or more C3-C4 hydrocarbons and be abbreviated as "LPG".

As used herein, the term "naphtha" can include one or more C5-C10 hydrocarbons and have a boiling point of about 25-about 190° C. at atmospheric pressure. The term "light naphtha" can include one or more C5-C6 hydrocarbons and have a boiling point of about 25-about 90° C.

As used herein, the term "kilopascal" may be abbreviated "KPa" and all pressures disclosed herein are absolute.

As used herein, the term "killed carbon steel" generally means a carbon steel deoxidized by the addition of aluminum, ferrosilicon, or other suitable compounds while the mixture is maintained at melting temperature until all bubbling ceases. Typically, the steel is quiet and begins to solidify at once without any evolution of gas when poured into ingot molds.

As depicted, process flow lines in the figures can be referred to interchangeably as, e.g., lines, pipes, liquids, solutions, alkalines, alkaline solutions, caustic, feeds, products, or streams.

DETAILED DESCRIPTION

Figure 1:
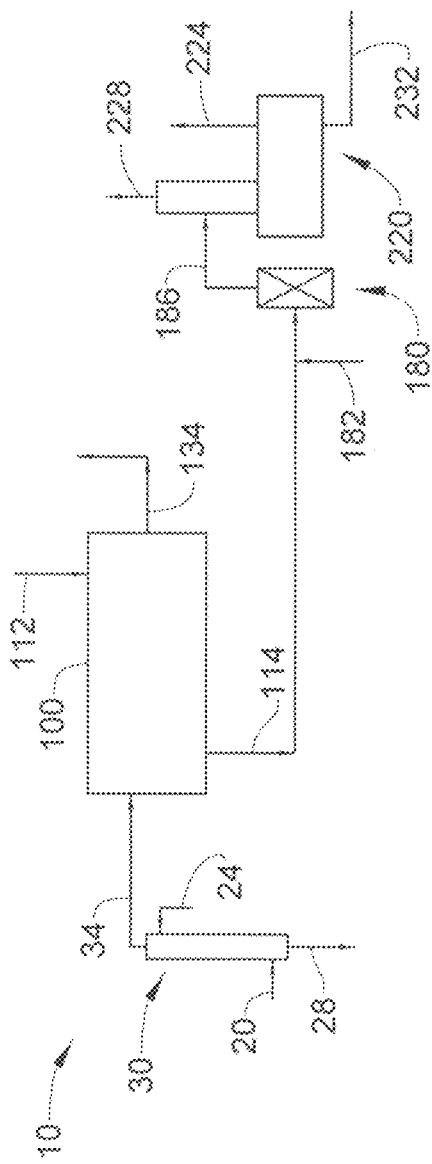
FIG. 1 is a schematic depiction of an exemplary apparatus for extracting one or more sulfur compounds from a hydrocarbon stream.

Referring to FIG. 1, an exemplary apparatus 10 for removing one or more sulfur-containing compounds, such as one or more thiol compounds, from a hydrocarbon stream 20 can include an alkaline prewash zone 30, a mass transfer zone 100, a thiol oxidation zone 180, and a separation zone 220. The vessels, lines and other equipment of the apparatus 100 can be made from any suitable material, such as carbon steel or killed carbon steel.

Usually, the hydrocarbon stream 20 is in a liquid phase and can include a liquefied petroleum gas or a naphtha hydrocarbon, preferably a light naphtha hydrocarbon. As such, the hydrocarbon stream 20 typically contains one or more C4 hydrocarbons, but may contain other hydrocarbons, such as at least one of C1-C3 and C5-C6 hydrocarbons, or at least one hydrocarbon up to a C10 hydrocarbon. The hydrocarbon stream 20 can include up to about 200 ppm, preferably no more than about 100 ppm, by weight, sulfur in hydrogen sulfide based on the weight of the hydrocarbon stream 20. Typically, the hydrocarbon stream 20 contains sulfur compounds in the form of one or more thiol compounds and/or hydrogen sulfide as well as carbonyl sulfide, one or more sulfides, and carbon disulfide. Although not wanting to be bound by theory, usually the hydrogen sulfide and the one or more thiol compounds are removable from the hydrocarbon stream 20 in the alkaline prewash zone 30 and the mass transfer zone 100.

Generally, the hydrocarbon stream 20 is combined with an alkaline solution for removing sulfur, e.g., hydrogen sulfide. The alkaline can be any alkali, and generally includes an aqueous solution of caustic soda, i.e., sodium hydroxide, or of ammonia. The hydrocarbon stream 20 can also be passed through an alkaline prewash vessel in the alkaline prewash zone 30. A fresh alkaline stream 24 may also be provided to the alkaline prewash zone 30. The hydrocarbon stream can include one or more C1-C10 hydrocarbons with hydrogen sulfide that typically is removed into a prewash alkaline solution that, in turn, can be removed via a line 28 and optionally at least partially recycled. A static mixer may be utilized for more efficient hydrogen sulfide removal in the alkaline prewash zone 30. Exemplary apparatuses having a hydrocarbon treatment section including an alkaline prewash vessel for the removal of sulfur species from the hydrocarbon stream, and an alkaline regeneration section including an oxidizer reactor and a separation vessel for removing sulfur-containing compounds from the circulating alkaline are disclosed in, e.g., U.S. Pat. No. 7,326,333.

The alkaline prewash zone 30 can provide a hydrocarbon stream 34 that may be substantially free of hydrogen sulfide that can be provided to the mass transfer zone 100. Optionally, a separate amine unit for hydrogen sulfide removal may be provided upstream of the prewash zone to avoid excess alkali consumption in the prewash zone at higher hydrogen sulfide levels. A prewashed hydrocarbon stream 34 may be provided to the mass transfer zone 100, which can include a hollow fiber membrane contactor, as discussed in further detail hereinafter. Alternatively, the hydrocarbon stream 34 can be provided directly to the mass transfer zone 100 without prewashing and/or other preparatory procedures. An alkaline stream 112 can be provided to the mass transfer zone 100 and a thiol-tainted alkaline solution 114, i.e., having extracted one or more thiol compounds, can be withdrawn and a hydrocarbon product stream 134 with little or no hydrogen sulfide and thiol compounds can be withdrawn and recovered as a product.

The thiol-tainted alkaline solution 114 can be combined with a stream 182 including oxygen, such as air, and optionally an oxidation catalyst. The oxidation catalyst can be any suitable oxidation catalyst, such as a sulfonated metal phthalocyanine. However, any suitable oxidation catalyst can be used, including those described in, e.g., U.S. Pat. No. 7,326,333. The optional oxidation catalyst, the air stream 182, and the thiol-tainted alkaline solution 114 can be combined before entering the thiol oxidation zone 180. Generally, the rich aqueous alkaline solution and air mixture are distributed in the oxidizer reactor. In the oxidizer reactor, although not wanting to be bound by theory, the sodium salts of the thiol compounds react with oxygen and water to yield disulfide oil and caustic, i.e., sodium hydroxide, and organic disulfides. Optionally, the oxidizer reactor can include packing, such as carbon rings, to increase the surface area for improving contact between the thiol-tainted alkaline and catalyst.

Afterwards, an oxidation outlet stream 186 from the oxidizer reactor can be withdrawn. The oxidation outlet stream 186 can include a disulfide-tainted alkaline solution, one or more hydrocarbons, one or more sulfur compounds, and a gas. Typically, the oxidation outlet stream 186 can include a gas phase, a liquid disulfide phase, and a liquid aqueous alkaline phase. Generally, the gas phase includes air with at least some oxygen depletion. In the gas phase, the oxygen content can be about 5-about 21%, by mole.

The oxidation outlet stream 186 can be received in the separation zone 220. The separation zone 220 can include any suitable process equipment, such as a disulfide separator, and can be operated at any suitable conditions, such as no more than about 60° C. and about 250-about 500 KPa.

A hydrocarbon-disulfide phase, an aqueous alkaline phase, and a gas phase including spent air may enter a stack of a disulfide separator in the separation zone 220. Generally, the gas phase separates from the liquid phases. The liquid disulfide and aqueous alkaline phases can enter a body of the disulfide separator and segregate. Generally, the disulfide phase can exit as a stream 224 and one or more gases may exit a stack as a stream 228. Usually, at least a majority of the one or more disulfides are separated and removed from the alkaline solution. Often, the alkaline phase can exit the bottom of the disulfide separator as a disulfide-tainted alkaline stream 232, which in this exemplary embodiment still may have excessive levels of disulfide. However, a majority of this stream 232 can be recycled to the alkaline stream 112 after optionally being combined with make-up alkaline solution and the remainder can be subject to further treatment or disposal.

Figure 2:
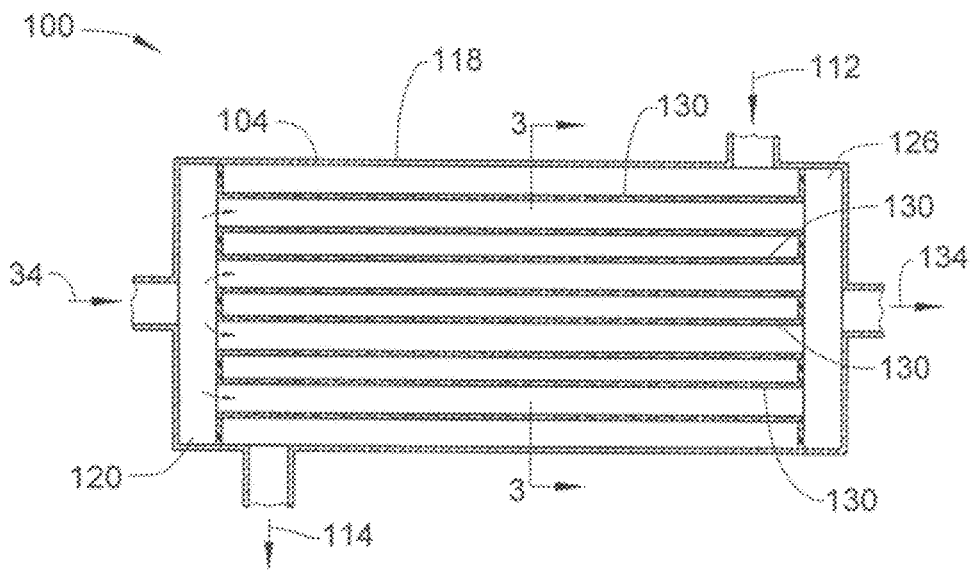
FIG. 2 is a cross-sectional view of an exemplary hollow fiber membrane contactor.
Figure 3:
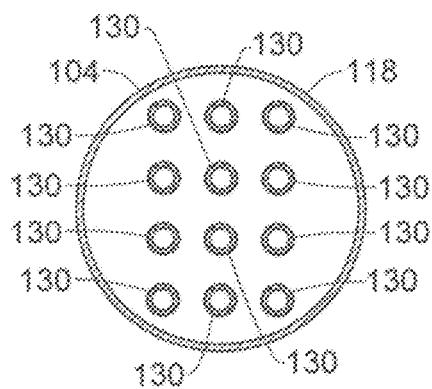
FIG. 3 is a cross-sectional view along line 3-3 of the exemplary hollow fiber membrane contactor.

Referring to FIGS. 2-3, the prewashed hydrocarbon stream 34 can be provided to a hollow fiber membrane contactor 104 to remove one or more sulfur compounds, particularly one or more thiol compounds. The hollow fiber membrane contactor 104 can include a shell 118 with a first chamber 120, a second chamber 126, and at least one tube 130. In this exemplary embodiment, the hollow fiber membrane contactor 104 can include twelve tubes 130, although the hollow fiber membrane contactor 104 can include any suitable number of tubes, including multiple tubes of thousands of tubes. The hollow fiber membrane contactor 104 may have hydrophobic and hydrophilic properties and include at least one of a ceramic, cellulose acetate, polypropylene, polysulfone, polyamide, and polytetrafluoroethylene.

An alkaline stream 112, typically a lean alkaline solution of sodium hydroxide, potassium hydroxide, or ammonia, in an aqueous solution, can be provided so the one or more thiol compounds can be extracted from the prewashed hydrocarbon stream 34 to the alkaline stream 112. The alkaline solution can be of any suitable strength, such as at least about 5, or about 15, by weight, of an alkali including sodium hydroxide, potassium hydroxide, or ammonia, based on the weight of the alkaline solution. Alternatively, the alkaline solution can be of any suitable strength, such as no more than about 20, by weight, of an alkali including sodium hydroxide, potassium hydroxide, or ammonia, based on the weight of the alkaline solution.

Generally, the walls of the tubes 130 can be porous. As the liquid from one of the streams 34 and 112 can fill the pores, a liquid-liquid extraction can occur with the tubes 130 maintaining phase separation. Usually, the one or more soluble one or more thiols permeate through the tubes 130 quickly as compared to the alkaline stream.

Although the tubes 130 are described as porous, non-porous tubes can be used as well. The transfer through a non-porous, solvent-swelled membrane is by diffusion, a process of mass-transfer which can occur as a movement of individual molecules. This movement of the solute in the extraction process can be induced by the partition coefficient of the solute in the two immiscible solvents. A non-porous, swelled membrane may be viewed as a form of gel. The solvents and solute involved in the extraction all interact with the membrane to form a single phase, polycomponent system. Such non-porous membranes are disclosed in, e.g., U.S. Pat. No. 3,956,112.

Particularly, the one or more thiol compounds can diffuse through the liquid filling the membrane pores and into the alkaline stream 112, which can be provided counter-currently to the prewashed hydrocarbon stream 34. Typically, the one or more thiol compounds are transferred at the pores of the membrane to the alkaline stream 112 because the one or more thiol compounds have a much greater mass transfer affinity in the alkaline solution or aqueous phase than, e.g., the liquefied petroleum gas or light naphtha comprised in the prewashed hydrocarbon stream 34. Generally, both the tube and shell sides of the hollow fiber membrane contactor 104 are maintained at about the same pressure to limit dispersive mixing. Moreover, the volumetric flow rate of the alkaline stream 112 can be substantially less than that of the prewashed hydrocarbon stream 34 thereby generally reducing the amount of extraction of any disulfide oil from a regenerated alkaline solution back into the prewashed hydrocarbon stream 34. As a result, a hydrocarbon product stream 134 can have less than about 10, preferably less than about 2 wppm sulfur, in the form of one or more thiol compounds. Although a single hollow fiber membrane contactor 104 is depicted, it should be understood that two or more hollow fiber membrane contactors may be utilized in parallel and/or series. Moreover, the alkaline stream 112 may be routed to a shell side of a hollow fiber membrane contactor bundle with the prewashed hydrocarbon stream 34 routed to the tube side, although the alkaline stream 112 may be routed to a tube side and the prewashed hydrocarbon stream 34 may be routed to a shell side. Although a counter-current flow schemes is disclosed, it should be understood the streams can be introduced co-currently.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for extracting sulfur compounds in a hydrocarbon stream, comprising:
   A) feeding a hydrocarbon stream containing one or more sulfur compounds to a prewash zone containing an ammonia;
   B) withdrawing a prewashed hydrocarbon stream from the prewash zone; and
   C) feeding the prewashed hydrocarbon stream to a mass transfer zone for extracting one or more thiol compounds from the prewashed hydrocarbon stream wherein the mass transfer zone comprises a hollow fiber membrane contactor comprising at least one tube, the tube having pores in the tube wall, wherein the extraction of one or more thiol compounds occurs through the pores in the tube wall.

2. The process of claim 1, wherein the hydrocarbon stream is fed to the prewash zone and the prewashed hydrocarbon stream is withdrawn from the prewash zone.

3. The process according to claim 1, wherein the alkali prewash zone further comprises at least one of a potassium hydroxide and a sodium hydroxide.

4. The process according to claim 1, wherein the hollow fiber membrane contactor comprises at least one of a ceramic, cellulose acetate, polypropylene, polysulfone, polyamide, and polytetrafluoroethylene.

5. The process according to claim 1, wherein the hollow fiber membrane contactor further comprises a shell.

6. The process according to claim 5, wherein the pre-washed hydrocarbon stream is provided to the at least one tube.

7. The process according to claim 6, wherein the at least one tube comprises multiple tubes.

8. The process according to claim 1, wherein the pre-washed hydrocarbon stream comprises one or more C1-C10 hydrocarbons.

9. The process according to claim 1, wherein the pre-washed hydrocarbon stream comprises a liquefied petroleum gas.

10. The process according to claim 1, wherein the pre-washed hydrocarbon stream comprises a naphtha.

11. The process according to claim 7, further comprising passing the ammonia from the mass transfer zone to an oxidation zone.

* * * * *